United States Patent Office 2,892,712

Patented June 30, 1959

2,892,712

PROCESS FOR PREPARING RELIEF IMAGES

Louis Plambeck, Jr., Wilmington, Del., assignor to E. I. du Pont de Nemours and Company, Wilmington, Del., a corporation of Delaware No Drawing. Application April 23, 1954
Serial No. 425,311

7 Claims. (Cl. 96—35)

This invention relates to a process for preparing relief images, and more particularly, to such a process which embodies photodegradation or photodepolymerization of a synthetic organic polymeric material. A preferred embodiment relates to a process for preparing printing relief images in or on the surface of a layer of a synthetic organic macromolecular addition polymer composition.

It is an object of this invention to provide new processes for producing relief images. More specific objects are to provide such processes for producing intaglio images suitable for use in gravure printing and for producing printing reliefs suitable for use as letterpress line and halftone printing plates. Another specific object is to provide a new process for producing decorative relief images. Yet another object is to provide simple processes for producing such reliefs. A further object is to provide such processes which utilize economical materials in convenient process steps. Still other objects will be apparent from the following description of the invention.

It has been found that relief images useful for decorative or printing purposes can be prepared by exposing to actinic light of wave lengths between 1800 and 7000 A., through an image-bearing transparency, a solid layer essentially comprising a synthetic organic macromolecular addition polymer, at least the surface of the layer having in contact therewith a photopolymerization catalyst or initiator activatable by actinic light of such wave lengths until substantial degradation of the polymer to substantially lower molecular weight products takes place in the light-exposed areas at least in the surface of said layer or sheet, and physically removing the degradation products in such light-exposed areas of the said layer without affecting the polymer in the non-exposed area, thereby forming an intaglio image in said exposed areas. The removal of the lower molecular weight products, which are markedly more volatile than the original polymer can be accomplished, depending on the specific polymer, in various ways, e.g., by volatilizing them by heating the layer, by extracting them with a solvent which is a non-solvent for the original polymer, by brushing or abrading, or by a combination of two, three or more of these methods.

The synthetic organic macromolecular addition polymers which are useful in accordance with this invention are those prepared from organic compounds of relatively small molecular size and preferably have a carbon to carbon polymer chain. The layer of the polymer can consist of one or a mixture of two, three or more synthetic organic macromolecular addition polymers, including copolymers. The composition of the layer, which may be a single self-suppporting sheet, or a layer on a suitable permanent support, can also vary through the incorporation of suitable reinforcing or filling agents, e.g., pigments and unreactive inorganic solids of small particle size including glass, mica, the silicas, the bentonites, etc. In addition, the layer or sheet can also contain minor amounts of entrapped solvent for either or both the polymer and the photodegradation product thereof.

In accordance with one aspect of the invention the catalyst or initiator can be incorporated in the layer or sheet, e.g., by simply admixing an appropriate amount of catalyst in a solution or dispersion of the polymer in a suitable solvent, casting a layer or self-supporting sheet therefrom, and allowing the solvent to evaporate. The catalyst or initiator can be added in liquid or solid form or from solution in a solvent. By such technique, the layer or sheet is rendered more sensitive to actinic light and accordingly should be protected from light-exposure prior to use. In an alternative, but less preferred procedure, the catalyst can be brought into operative association with the surface of the organic polymer prior to light-exposure, e.g., by coating the surface of the polymer sheet with a solution or dispersion containing the catalyst or initiator. In each of these alternatives the catalyst or initiator molecules are in a close or intimate, operative or effective association or contact with the macromolecular polymer. When the catalyst or initiator is distributed through the entire layer of polymer, depolymerization can be better effected through the depth of the layer.

In a further aspect of the invention, a solvent for the degradation or depolymerization products is in contact with the layer of polymer during the light-exposure when degradation or depolymerization occurs. The presence of such a solvent is especially useful in the exposure of a layer or sheet composed of an addition polymer of an ethylenically unsaturated monomer since the degradation or depolymerization of this type of polymer, depending on the particular polymer, may be reversible so that a portion of the depolymerization products will recombine to form high molecular weight products which are not removable during the subsequent development of the intaglio image. Like the catalyst, the solvent can be supplied prior to exposure by coating the surface of the layer or sheet of synthetic organic polymer with the solvent, or the solvent may be present in the layer (e.g., by entrapment therein during the preparation of the layer or sheet).

The term "solvent" is used here in its broad sense and includes organic liquids capable of swelling and plasticizing the layer or sheet of polymer, as well as organic liquids which completely dissolve the degradation products, e.g., monomers. Thus, a plasticizer or swelling agent for the polymer of the layer or sheet to be exposed, for instance, a low molecular weight polyalkylene glycol diester, e.g., triethylene glycol bis(2-ethylhexanoate), or a hydrogenated or halogenated polycyclic aromatic hydrocarbon, e.g., hydrogenated terphenyl, will normally be solvents for the degradation or depolymerization products in the case of poly(ethyl methacrylate) and poly($\alpha$-methylstyrene), respectively. Liquid methyl methacrylate monomer will be a solvent for the products of photodegradation of a poly(methyl methacrylate) base sheet, for instance, when applied to the surface of the sheet in a composition thickened through the addition of poly(methyl methacrylate).

When letterpress printing reliefs are being prepared, the image-bearing transparency is a process transparency consisting solely of substantially opaque and substantially transparent areas where the opaque areas are of the same optical density, i.e., a so-called line or halftone negative. Both process negatives or positives can be used. Thus, the process transparency can have either clear areas, letters, or characters, etc., on an opaque background or opaque areas, letters or characters, etc., on a clear background. Since light is passed essentially through only the clear areas in the transparency, the polymer sheet is exposed in the light paths under the clear areas in the transparency and, accordingly, is degraded or depolymerized only in such exposed areas. The image of the clear areas of the transparency that is produced in the polymer sheet, after removal of the degraded or depolymerized polymer, is intaglio, i.e., incised into the surface of the polymer sheet. These incised areas constitute the non-printing portions of a letterpress plate. The ink-carrying portions, i.e., the printing relief, in such plates are those portions which were under the opaque area of the transparency and accordingly were not degraded by the light. In general, a positive transparency is used when the usual photoengraving procedure would employ a negative, and vice versa.

In making gravure plates by the process of this invention, the exposed areas of the plate after removal of the degradation or depolymerization products, provide the depressions which receive the ink. Hence, instead of the positive used in ordinary gravure processes, a negative is used in the processes of this invention. Moreover, the necessity of providing a screen pattern requires a different sequence of operations. For instance, a useful procedure involves the contact-printing of a normal gravure screen onto a photographic film, the exposing of this film to the desired copy, either line or continuous tone, and the processing of the exposed film to a negative. Lateral reversal is taken care of in normal fashion by the use of an optical image reverser on the camera or by means of a stripping film. The surface of the layer or sheet of synthetic organic polymer, described above, is then exposed to actinic light in contact with the laterally reversed image-bearing negative.

The preparation of Dultgen-type process plates can also be accomplished in accordance with this invention. In such a procedure the layer or sheet of synthetic organic macromolecular polymer, described above, is exposed to a continuous tone negative and a screened negative at the same time. This is done by superimposing the negatives or by combining them photographically.

The following examples, in which the parts given are by weight, are submitted to illustrate the invention specifically but not to limit it.

*Example I*

A photopolymerizable viscous solution of 80 parts of liquid partially polymerized methyl methacrylate and 1 part of benzoin in 20 parts of liquid monomeric polyethylene glycol dimethacrylates, containing an average of about four ($-OCH_2-CH_2-$) groups, was coated on a 150-mil thick sheet of an 80/20 methyl methacrylate/polyethylene glycol dimethacrylate copolymer (obtained by photo-polymerization of similar liquid monomers), and a line process negative carrying black, i.e., substantially opaque, background areas and clear text or letter portions, mounted on a glass plate was placed with the emulsion side of the negative in contact with the viscous liquid layer, said plate resting on small 8 to 10-mil thick spacers arranged at the corners of the base sheet of copolymer. This assembly was then exposed for 10 minutes to the light from an RS mercury vapor sunlamp spaced at a distance of 7 inches from the sheet. The glass plate with the attached negative was removed from the assembly carrying with it, attached directly to the negative, polymer which had formed in the photopolymerizable liquid layer under the clear areas of the negative. Complete removal of the remains of the liquid layer, by brushing with an 85/15 mixture of ethyl acetate/ethanol, revealed in the upper surface of the said base sheet of copolymer a sharp, detailed, but shallow, intaglio, i.e., incised, image of the letter text of the negative.

*Example II*

A 10-mil layer of a 10% solution of poly(vinyl acetate) in methanol, containing 5% benzoin based on the total solution, was coated on a poly(methyl methacrylate) sheet, a line process negative mounted on a glass plate was placed in contact with said layer, and the sheet exposed for 6 minutes to an RS mercury vapor sunlamp spaced at a distance of 7 inches, all as described in Example I. The glass plate, with the adherent negative, was removed and the poly(vinyl acetate) solution removed from the surface of said sheet, by washing it with methanol. A clear image of the text of the negative, i.e., intaglio in the clear areas, was obtained in the surface of the poly(methyl methacrylate) sheet.

*Example III*

A thin layer of a mixture of 60 parts of benzoin methyl ether, 35 parts of hydrogenated terphenyl and 5 parts of dibutyl phthalate was coated on a 40-mil thick sheet of a photopolymerized 70/30 addition polymerizable polyester/monomeric styrene mixture, of the type described in Industrial and Engineering Chemistry 44, No. 3, 11A (1952). A process line negative with clear letters in a black background and mounted on a glass plate was placed with the emulsion side down and directly in contact with the thin layer of the mixture. No spacers were used in the assembly and only a very thin layer (approximately one mil in thickness) of the above mixture remained between the negative and the resin base plate. After exposeure for a period of two hours to the light from three RS and one S-4 mercury vapor sunlamps at a distance of 12 inches, the negative was removed from the assembly and the base plate was rinsed free of the benzoin methyl ether/hydrogenated terphenyl/dibutyl phthalate layer, with methanol. The surface of the polymerized 70/30 polyester/styrene sheet contained a clear, sharp intaglio image of the text of the negative. The letters on this surface, when inked and printed on paper gave a faithful reproduction of the original text in the process negative.

*Example IV*

A solid 30-mil layer of the 70/30 polymerizable polyester/monomeric styrene mixture of Example III was photopolymerized, on a primed steel base plate. This polymer surface was then coated with a thin layer of a viscous solution of one part of benzoin methyl ether in 100 parts of the 70/30 polyester/monomeric styrene mixture of Example III. A line process negative was superposed on the layer using 10-mil spacers at the corners and the assembly exposed for 10 minutes to the light from an RS mercury vapor sunlamp spaced therefrom at a distance of 8 inches. After removal of the negative and spacers and excess viscous polymerizable mixture by washing with an 85/15 ethyl acetate/ethanol mixture, there was obtained a relief image of the text of the negative. After such removal and by vigorous brushing and physical fracture of polymeric material adhering to the surface of the solid layer, there was obtained a clear, sharp, intaglio image of the text of the negative incised into the surface of such layer, the intaglio image occurring directly underneath the areas where the relief image was formed by photopolymerization in the viscous layer, i.e., under the clear areas of the negative.

*Example V*

A 40-mil thick solid sheet of copolymer, prepared by the photopolymerization of a viscous solution of 20 parts of poly(methyl methacrylate), 35 parts of a 70/30 addition polymerizable polyester/monomeric styrene mixture (of the kind described in Example III) and one part of benzoin methyl ether in 45 parts of monomeric styrene, was coated with a thin film of a viscous solution of one part of benzoin methyl ether and 20 parts of poly(vinyl acetate) in 80 parts of methanol. A process line negative was superposed thereon using 10-mil corner spacers and the assembly then exposed to the light from an RS mercury vapor sunlamp at a distance of 8 inches for 20 minutes. After removal of the negative and spacers, and the excess poly(vinyl acetate) solution by washing with methanol, there was obtained an intaglio image of the clear areas of the negative incised into the surface of the preformed copolymer sheet.

*Example VI*

A solution of about 4 parts of poly(methyl methacrylate) (thermally polymerized with benzoyl peroxide), 0.2 part of benzoin methyl ether, and 0.4 part of omega, omega,omega-trichloroacetophenone in about 30 parts of chloroform, was cast on a glass plate, and the chloroform was allowed to evaporate in the dark for one hour at 25° C. The surface of the resultant 15-mil thick solid film was coated with a 10-mil thick layer of a hydrocarbon oil, and a process line negative carrying a text of dark letters on a clear background and mounted on a glass plate was then superposed directly thereon using 10-mil spacers at the four corners. After exposure for 60 minutes to the light from an RS mercury vapor sunlamp at a distance of 8 inches, the negative was removed from the assembly and the base plate rinsed free of the hydrocarbon layer and the depolymerization products with methanol. There was obtained a clear, sharp, relief image, about 1-mil high, of the dark letters in the negative on the surface of the poly(methyl methacrylate) sheet.

*Example VII*

A sheet of 5-mil film of moderately high molecular weight unstabilized formaldehyde polymer, prepared from purified gaseous formaldehyde in a cyclohexane medium using tertiary-butylamine initiator, was placed on a glass plate and its surface coated with a thin layer of omega, omega-dibromoacetophenone. A layer of hydrocarbon oil (5 to 10 mils in thickness) was coated on the surface of the sheet and a process negative carrying a text of clear letters on a black background and mounted on a glass plate was then superposed directly in contact with the oil layer. After exposure of the assembly for 60 minutes to the light from an RS mercury vapor sunlamp spaced therefrom a distance of 8 inches, the process negative and upper glass plate were removed and the hydrocarbon oil layer washed away with methanol. A thin legible image of the letter text in the negative was revealed in the form of more opaque areas on the surface of the exposed film. The exposed sheet of formaldehyde polymer was baked for one hour at 105° C. in an oven, to develop the image. There was thus obtained, a clear, sharp, intaglio image of the clear letter text on the negative, incised into the surface of the formaldehyde polymer film.

*Example VIII*

A solution of one part of high molecular weight polytetrahydrofuran ($\eta$inh=3.35) and 0.1 part benzoin methyl ether in about 17.5 parts of thiophene-free benzene was cast onto a glass plate and the benzene allowed to evaporate in the dark at 25° C. for a period of one hour. A surface of the resultant sheet of polytetrahydrofuran was coated with a thin layer of a hydrocarbon oil and a line process negative carrying clear letters on a dark background and mounted on a glass plate was superposed directly on the oil layer. After exposure for one hour to the light from an RS mercury vapor sunlamp spaced a distance of 8 inches therefrom, the negative was removed from the assembly and the exposed polytetrahydrofuran film washed with methanol thus removing the hydrocarbon oil layer and the depolymerization products. A clear, sharp intaglio image of the clear text in the negative, incised into the surface of the polytetrahydrofuran sheet, was obtained.

Essentially similar results were obtained, substituting for the benzoin methyl ether catalyst in Example VIII about 0.1 part of cobalt naphthenate.

*Example IX*

Another 5-mil film sample of the formaldehyde polymer described in Example VII was mounted on a glass plate and the film coated with an about 1-mil layer of a water-based paste of 4-sulfonaphthalene-1,2-diazooxide, prepared, as given on page 30 of "The Aromatic Diazo Compounds," by K. H. Saunders, Edward Arnold & Co., London, 2nd ed., 1949. The coated film was dried at room temperature and a 10-mil layer of hydrocarbon oil was then coated on the treated film and a process negative carrying a text of clear letters on a black background and mounted on a glass plate was superposed directly thereon in contact with the oil layer using small 10-mil thick spacers at the four corners. After exposure to the light from an RS mercury vapor sunlamp for 60 minutes at a distance of 8 inches, the process negative and upper glass plate were removed from the assembly and the hydrocarbon oil layer wiped off. The remaining diazooxide layer was removed by washing with water and after drying, the exposed film was then baked in an oven for one hour at 100° C. to develop the image. There was thus obtained a clear, legible, intaglio image of the clear letter text on the negative incised into the surface of the formaldehyde polymer sheet.

As will be apparent from the foregoing examples, the optimum exposure times will vary with the particular synthetic organic polymer forming the base sheet or layer and also with the amount, i.e., depth, of degradation or depolymerization desired. As is conventional in photographic processes generally, suitable simple tests such as stepped exposures will enable one to select effective conditions.

The polymer sheet may vary widely in thickness and may be in itself a self-supporting film or plate, or it can be in the form of a layer of the desired synthetic polymer carried on a suitable support, such as, a film, e.g., a cellulose derivative including cellulose acetate, cellulose propionate, cellulose acetate butyrate, etc.; a super polymer, including nylon, a polyethylene terephthalate, poly(vinyl chloride), poly(vinyl chloride co vinyl acetate), or a plate composed of such materials or of a metal, e.g., zinc, aluminum, steel, etc. The layer or sheet of synthetic organic macromolecular polymer must be of sufficient thickness to form an intaglio image deep enough to be visible, in the case of decorative effect uses, and deep enough so that the plate can successfully carry ink, in the case of printing uses. Generally, the layer or sheet must be at least 0.1 mil in thickness and for printing purposes need not be any greater in thickness than about 500 mils. Of course, the thickness of the layer or sheet can be much greater than 500 mils, but any greater thickness serves no particular purpose insofar as the depolymerization or degradation step is concerned since, even in letterpress printing, relief printing heights of such magnitude are rarely used. For reasons of greater mechanical strength and convenience, i.e., direct use as a printing plate, however, it may be desirable to use a layer or sheet of overall thickness appreciably greater than 500 mils. A practical range of thickness for the synthetic polymer layer or sheet, for printing purposes, is from about 3 to about 150 mils.

When the support is composed of a transparent film or plate it may be provided with an anti-halation layer which may be on its rear surface, or between the front surface and the layer of macromolecular polymer. In the case of light-opaque supports, the antihalation layer is on the front surface beneath the layer of polymer. Any of the antihalation dyes or pigments used in photographic films, which absorb actinic light can be used. Suitable materials include comminute silver, carbon black, dyes, e.g., ink Blue B (C.I. 707), Nigrosine SSJ (C.I. 864), etc. In the case of transparent supports, the antihalation dye or pigment can be in the film support.

The synthetic organic polymers of the addition-type useful in the process of this invention, as illustrated specifically in the foregoing examples, are essentially free from unsaturated linkages and include those prepared from monomers free from ethylenically and acetylenically unsaturated groups as well as those prepared from ethylenically unsaturated monomers. Suitable examples of the former type include polyacetals, e.g., formaldehyde polymer, polymers of imines, e.g., polyethyleneimine, polyethers, such as those from epoxides, e.g., polypropyleneoxide, tetrahydrofuran polymer.

The acetal-addition polymers useful in accordance with the invention, undergo degradation or depolymerization to the monomers when exposed to light more rapidly in the presence of acidic materials, e.g., preferably those which are capable of activation by light, e.g., phenyl trichloromethyl ketone; acidic diazo compounds such as diazotized 1-amino-2-hydroxynaphthalene-4-sulfonic acid, especially at elevated temperatures. Under these conditions, the degradation products do not recombine appreciably to form the polymer and there is little advantage in having present in the synthetic polymer layer, or on the surface thereof, a solvent for the degradation or depolymerization products. With such addition polymers, depolymerization can frequently be accelerated at elevated temperatures, e.g., from 100 to 150° C. In some instances, a heat treatment after exposure serves as the development stage and leads directly to the formation of the desired intaglio image.

The ether-type addition polymers are depolymerized more rapidly in the presence of a light-activated free radical generating catalyst, e.g., benzoin methyl ether, phenyl trichloromethyl ketone, etc. In addition, because of their tendency to form peroxides, it is desirable that there also be present an air-drying or air-oxidation catalyst, e.g., metal salts of the naphthenic acids, including cobalt naphthenate.

In place of the specific addition polymers and copolymers made from ethylenically unsaturated monomers used as the sheet or layer for the reception of the intaglio image in the foregoing examples, there can be substituted various other such addition polymers. The vinylidene polymers and copolymers, including the vinyl polymers and copolymers made from monomers having at least one terminal ethylenic double bond are especially useful. Such monomers are represented by the general formula:

$$CH_2{=}C\Big\langle{}^{R}_{X}$$

where R is hydrogen, an alkyl, e.g., methyl, radical or a halogen, e.g., Cl, Br, or F, and X is hydrogen, a hydrocarbon radical, e.g., methyl, ethyl or phenyl or a negative group, e.g., halogen, such as Cl, Br, or F, —CN, —COOH, $-CONH_2$, —CONHR′, $-CONR'_2$, $$-\overset{O}{\overset{\|}{C}}-R',\quad -\overset{O}{\overset{\|}{C}}-O-R',\quad -\overset{O}{\overset{\|}{C}}-H,\quad -O-C{\Big\langle}{}^{O}_{R}$$

and ether radicals, e.g., —OR″; wherein R and R′ are alkyl radicals and R″ is an alkyl or aryl radical. Specific useful polymers include poly(methacrylic acid), poly(ethyl acrylate), poly(methyl chloracrylate), and polyethylene.

Other useful classes of polymers for the sheet of layer to be depolymerized are the polymers of polymerizable monomers containing two ethylenic unsaturations, preferably terminal, conjugated or not, e.g., methacrylic and acrylic acid diesters of ethylene glycol and the polyethylene glycols, including diethylene glycol, triethylene glycol, and tetraethylene glycol and mixtures of such glycols; methacrylic and acrylic diesters of polymethylene glycols including trimethylene glycol, tetramethylene glycol and hexamethylene glycol; divinylbenzene, diisopropenyldiphenyl, crotyl methacrylate, diallyl phthalate, diallyl maleate, triallyl cyanurate; polybutadiene, and poly-2-chlorobutadiene. Other suitable polymers, which can be used to make the sheet or layer that is to receive the intaglio image, are addition polymers or copolymers prepared from condensation polymers containing an ethylenically unsaturated group, e.g., those made by reacting an ethylene-α-β-dicarboxylic acid or anhydride, e.g., maleic, fumaric, or itaconic acid or anhydride with a glycol, e.g., ethylene glycol, diethylene glycol, triethylene glycol and propylene glycol. Such polymers have a low acid number, e.g., 20 and below to 50. Suitable addition polymers of this type are described in Ellis U.S. Patent 2,255,313.

When the addition polymers of the ethylenically unsaturated monomers are present in the polymeric stratum which is to be depolymerized, it is preferable that the said stratum contain small amounts of one or more of the well known free radical generating addition polymerization initiators or catalysts activatable by actinic light. Suitable specific initiators or catalysts include: the peroxy-containing catalysts, e.g., benzoyl peroxide; the azo-type polymerization catalysts or initiators described in Hunt U.S. Patent 2,471,959 including α,α′-azodiisobutyronitrile; α,α′-azodiisobutyramide, and α,α′-azobis(α,γ-dimethylvaleronitrile); the vicinal ketaldonyl compounds, e.g., diacetyl, benzil; the α-ketaldonyl alcohols, e.g., benzoin and pivaloin; the acyloin ethers, e.g., benzoin methyl and ethyl ethers; the α-hydrocarbon substituted aromatic acyloins, e.g., α-methylbenzoin, α-allylbenzoin and α-phenylbenzoin, halogenated ketones, e.g., phenyl trichloromethyl ketone and phenyl dibromomethyl ketone. These light-activated polymerization initiators are also known to be light-activated catalysts or initiators of depolymerization. The light-activated polymerization initiators which are not thermally active below 85° C. are preferred.

With both the above-discussed classes of addition-type polymers, the added photopolymerization catalyst or initiator activatable by actinic light, i.e., respectively, the ionic and free radical generating catalyst or initiator can be used in a wide range of proportions. A convenient way of bringing the catalyst into operative association with the layer or sheet to be depolymerized is to paint or coat its surface with a 0.1 to 25% or more by weight solution in a suitable solvent of the particular type of photopolymerization catalyst or initiator being used. The solvent is evaporated leaving a layer of initiator. When intaglios of appreciable depth are desired, it is preferred to have the catalyst dispersed throughout the polymer sheet. This can be accomplished by dissolving the polymer and catalyst or initiator in the amount of 0.1 to 25% by weight based on the macromolecular copolymer in a common solvent and casting a sheet therefrom. In many instances, as pointed out previously, particularly for the reversible depolymerization of the polymers of the ethylenically unsaturated addition-type monomers, it is desirable that a solvent for the degradation products be present at the interface. For convenience, the solvent carrier for the photopolymerization catalyst or initiator can be chosen so as to be also a solvent or plasticizer for the products of depolymerization. This dual action as a solvent for both the catalyst or initiator and the products of depolymerization, is possessed by plasticizers for addition-type polymers, such as the polyesters, e.g., dibutyl phthalate, dioctyl sebacate, and the like, and halogenated viscous to semi-liquid hydrocarbons, e.g., chlorinated paraffin, chlorinated biphenyl, and the like.

In such instances, the plasticizers serve also as a separating or parting layer between the process transparency and the sheet or layer of polymer, thereby assuring the presence at the interface of both the photopolymerization catalyst or initiator and the solvent for the degradation or depolymerization products. The thickness of this intermediate solvent layer is not critical, and for economy and convenience can be quite thin, e.g., the order of 1–10 mils or so. The thickness can be achieved by the use of spacers. However, the solvent layer can be of such viscosity as to support the process transparency directly, by the addition of suitable polymers or viscous plasticizers to the solvent, if necessary.

The solvent layer should have no significant solvent action on the addition polymer, during the period of exposure. When the exposure and degradation or depolymerization process is completed and the process transparency removed, the intermediate solvent layer, if present, is removed either by draining, brushing, blotting, or by washing with still further quantities of solvent or a combination of such steps, and the intaglio or incised image thereby developed. In some cases, e.g., with the condensation polymers, or when substantial quantities of added fillers, such as the substantially transparent organophilic silicas and the like, are present, etc., more vigorous treatment than simple removal of the intermediate solvent layer may be necessary in order to obtain a clean intaglio or incised image. Extensive washing or mechanical action, e.g., brushing or solvent spraying will usually suffice to remove all the materials in these areas. In some instances where the degradation or depolymerization products are volatile, no development steps except possibly short heating will be necessary.

The solvent used, either in the above-discussed type intermediate surface layer or in any necessary solvent development stage, will vary widely with the particular nature of the polymeric sheet or layer being employed. Generally speaking, suitable solvents include common organic solvents such as the alphatic and cycloaliphatic alcohols of no more than 8 carbons, e.g., methanol, ethanol, propanol, isopropanol, the butanols, and cyclohexanol and particularly water-miscible alcohols; the aliphatic and cycloaliphatic ketones of no more than 8 carbons, e.g., acetone, methyl isopropyl ketone, methyl isobutyl ketone, and cyclohexanone; methyl acetate and ethyl acetate; mono- and disubstituted amides of the lower aliphatic carboxylic acids, e.g., dimethylformamide; cyclic ethers, esters and sulfones, e.g., dioxane, cyclic ethylene carbonate, tetramethylenesulfone, etc. Mixtures of water-miscible alcohols and water can be used. Also mixtures of two or more of these solvents are useful. The solvent used should not have an appreciable solvent or swelling action on the synthetic, organic macromolecular polymer of the original sheet or layer.

Actinic light of wave lengths from 1800 A. to 7000 A., and especially short wave light predominating in wavelengths from 2400 A. to 4500 A., from any source, can be used in carrying out the processes of this invention. However, if images of appreciable depth are sought, it is desirable to use light in the form of parallel rays.

Inasmuch as the available photopolymerization initiators or catalysts generally exhibit their maximum sensitivity in the ultraviolet range, the light source should furnish an effective amount of this radiation. Such sources include carbon arcs, mercury vapor arcs, fluorescent lamps with special ultraviolet light emitting phosphors and photographic flood lamps. Of these, the mercury vapor arcs, particularly the sunlamp type, are most suitable and they are usually placed at distances of about seven to ten inches from the sheet or layer of polymer that is to receive the intaglio image.

The sheets or layers containing the images produced by the process can be used in various manners as a printing plate. They can be tacked, glued or otherwise affixed to a suitable metal or wooden or plastic block which is used in the printing press. The sheets can be molded to form a curved printing surface as in a cylinder press. A curved exposure set-up can also be used with a curved sheet of polymer serving as the support and bottom of the cell or assembly.

The invention provides a simple process for producing printing plates and decorative images. It has the advantage that inexpensive reliefs can be made in a relatively short time, as compared with conventional acid etching processes. In its applicability to the preparation of printing reliefs, the process eliminates the use of heavy and expensive metal plates and yet provides printing surfaces which have a very long life. The chief advantage of the process resides in that modification wherein a photosensitive sheet is prepared initially since such materials can be handled conveniently as dry, non-tacky sheets which are easy to store. A further advantage in those instances wherein a polymer degrading to a volatile monomer is used, is that no liquid development step is necessary.

The invention claimed is:

1. A process for the production of an intaglio printing relief which comprises exposing to actinic light of wavelength between 1800 and 7000 A. through an image-bearing transparency, a solid layer from 0.1 to 500 mils in thickness essentially comprising a synthetic organic macromolecular addition polymer of an ethylenically unsaturated compound, said polymer having a wholly carbon chain, being essentially free from intrachain ethylenic unsaturation, and being capable of undergoing degradation to form an ethylenically unsaturated compound when exposed to actinic light of an aforesaid wavelength in the presence of an addition polymerization initiator activatable by such light, at least the surface of said solid layer having in contact therewith an aforesaid initiator and bearing a separate liquid layer embodying a solvent for degradation products of said polymer, said exposure being continued until substantial degradation of said polymer to substantially lower molecular weight products takes place in the light-exposed areas at least in the surface of said layer and an incised image is formed in the surface of said solid layer without any substantial formation of solid polymer in the exposed depolymerized areas and in areas corresponding to said exposed areas and immediately adjacent to the surface of said layer, and physically removing degradation products in the light-exposed areas of said solid layer and any material on said solid layer leaving the polymer unchanged in the non-exposed areas of said solid layer.

2. A process as set forth in claim 1 wherein said solid layer is from 3 to 500 mils in thickness and said polymer has a wholly carbon chain.

3. A process as set forth in claim 1 wherein said polymer is an addition polymer of an ethylenically unsaturated monomer having at least one terminal ethylenic bond.

4. A process as set forth in claim 1 wherein the degradation products are removed by means of a solvent therefor which is a non-solvent for the addition polymer.

5. A process as set forth in claim 1 wherein said solid layer also contains such an initiator.

6. A process for the production of an intaglio printing relief which comprises exposing to actinic light of wavelengths between 1800 and 7000 A. through an image-bearing transparency, a solid layer from 0.1 to 500 mils in thickness essentially comprising a synthetic organic macromolecular addition polymer which is essentially free from intrachain ethylenic unsaturation, said polymer being taken from the group consisting of intrachain polyimines and polyethers wherein any side chains attached to chain carbons are wholly hydrocarbon, at least the surface of said layer having in contact therewith an addition polymerization initiator activatable by actinic light of such wavelengths, until substantial degradation of the polymer to substantially lower molecular weight products takes place in the light-exposed areas at least in the surface of said layer and an incised image is formed in the surface of said solid layer without any substantial formation of solid polymer in the exposed depolymerized areas and in areas corresponding to said exposed areas and immediately adjacent to the surface of said layer, and physically removing the degradation products in the light-exposed areas of the said solid layer and any material on said solid layer leaving the polymer layer unchanged in the non-exposed areas of said solid layer.

7. A process as set forth in claim 6 wherein said degradation products are removed by heating the resulting element to volatilize said products.

References Cited in the file of this patent

UNITED STATES PATENTS

| | | |
|---|---|---|
| 1,574,357 | Beebe et al. | Feb. 23, 1926 |
| 1,655,127 | Beebe | Jan. 3, 1928 |
| 1,957,900 | Murray | May 8, 1934 |
| 2,484,529 | Roedel | Oct. 11, 1949 |
| 2,604,388 | Staehle | July 22, 1952 |
| 2,675,315 | Staehle et al. | Apr. 13, 1954 |
| 2,712,996 | Elliott | July 12, 1955 |
| 2,760,863 | Plambeck | Aug. 28, 1956 |

OTHER REFERENCES

"Modern Heliographic Processes," Lietze, published by D. Van Nostrand Company (1888), pages 76–78. Copy in Div. 67.

Mesrobiam et al.: Jour. Polymer Science, vol. 2, 1947, pages 463–467. Copy in Div. 60.

Cowley et al.: "Proceedings of Royal Society of London," Ser. A, vol. 210, pages 461–481 (1951), and Ser. A, vol. 211, pages 320–334 (1952). Copies in library.

Achhammer et al.: Jour. Pol. Sci., vol. 8, 1952, pages 555, 566–570. Copy in Div. 60.

Burgess: "Chemistry and Industry," January 26, 1952 (pp. 78–81).

Burnett: "Mechanism of Polymer Reactions," Interscience Pub., Inc., New York (High Polymers, vol. 3) (1954), pages 373–394.